United States Patent [19]
Pittelko

[11] Patent Number: 5,146,845
[45] Date of Patent: Sep. 15, 1992

[54] CONTINUOUS CHEESE FORMER FOR BULK CHEESE

[75] Inventor: Allen J. Pittelko, Oakfield, Wis.

[73] Assignee: Damrow Company, Inc., Fond du Lac, Wis.

[21] Appl. No.: 741,319

[22] Filed: Aug. 7, 1991

[51] Int. Cl.[5] .................. A01J 11/06; A01J 25/00; A01J 25/11

[52] U.S. Cl. .................................. 99/454; 99/452; 99/458; 99/465

[58] Field of Search .................................. 99/452–454, 99/456, 458, 459, 460, 465, 472; 426/486, 491, 478, 517; 425/85

[56] References Cited

U.S. PATENT DOCUMENTS

| | | | |
|---|---|---|---|
| 3,468,026 | 9/1969 | Robertson et al. | 99/454 |
| 4,061,794 | 12/1977 | Charles | 99/458 |
| 4,137,836 | 2/1979 | Megard | 99/456 |
| 4,152,101 | 5/1979 | Charles | 425/85 |
| 4,244,286 | 1/1981 | Rust | 99/535 |
| 4,334,465 | 6/1982 | Brockwell et al. | 99/458 |
| 4,539,902 | 9/1985 | Brockwell et al. | 99/460 |

FOREIGN PATENT DOCUMENTS

88/07322 10/1988 PCT Int'l Appl. .................. 99/459

*Primary Examiner*—Timothy F. Simone
*Attorney, Agent, or Firm*—Andrus, Sceales, Starke & Sawall

[57] ABSTRACT

A cheese former for making large batches of cheese in a continuous process includes a tower having a screen along its internal side wall and a central screen extending along the axis of the tower, wherein whey may be separated from a curds and whey mixture introduced into the tower by drawing the whey through the screens toward both the perimeter of the tower and the central axis of the tower for removal from the system. This permits large quantities of cheese such as 600–650 pound blocks or 500 pound barrels to be made in a continuous tower forming system.

49 Claims, 5 Drawing Sheets

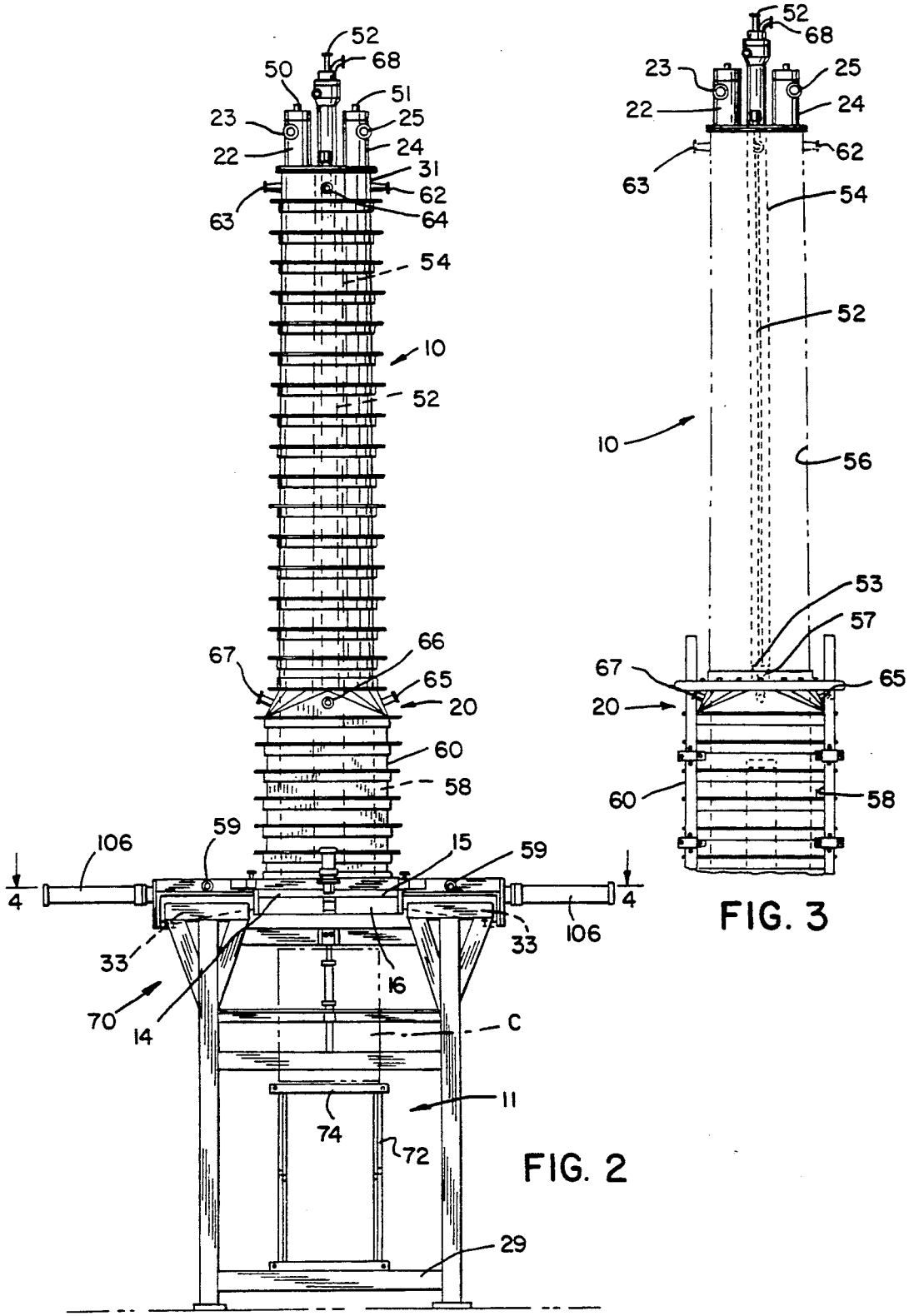

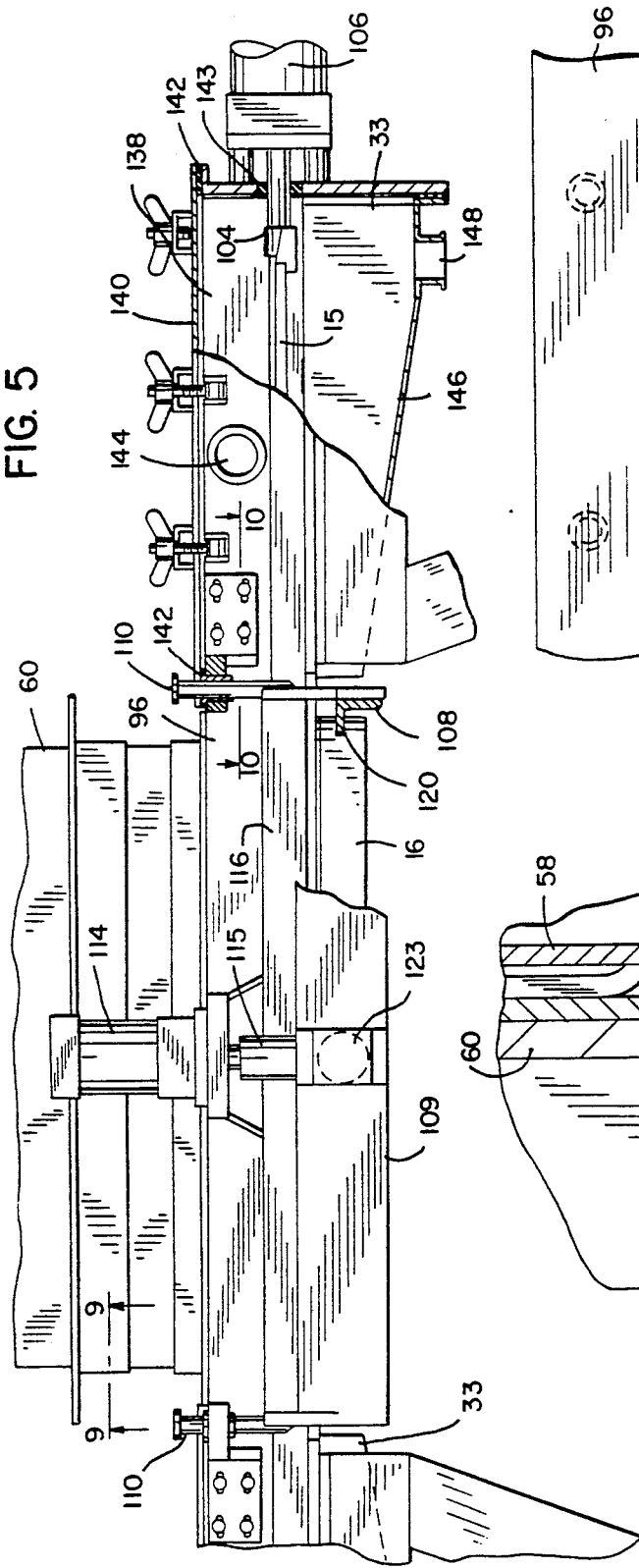
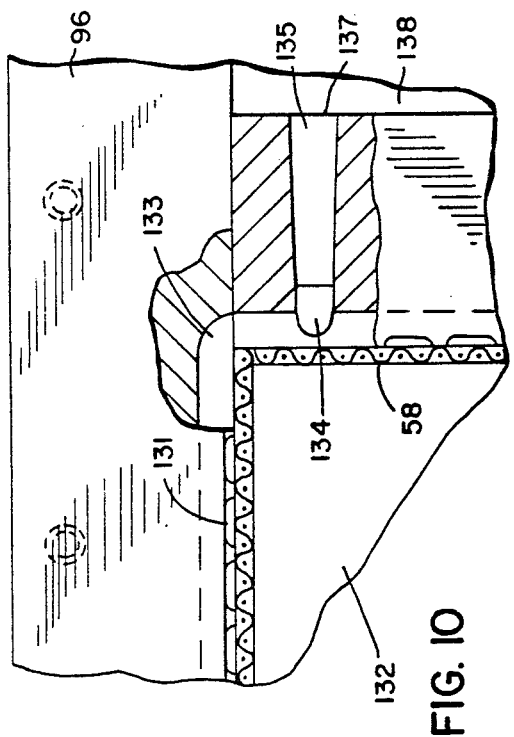
FIG. 5
FIG. 10
FIG. 9

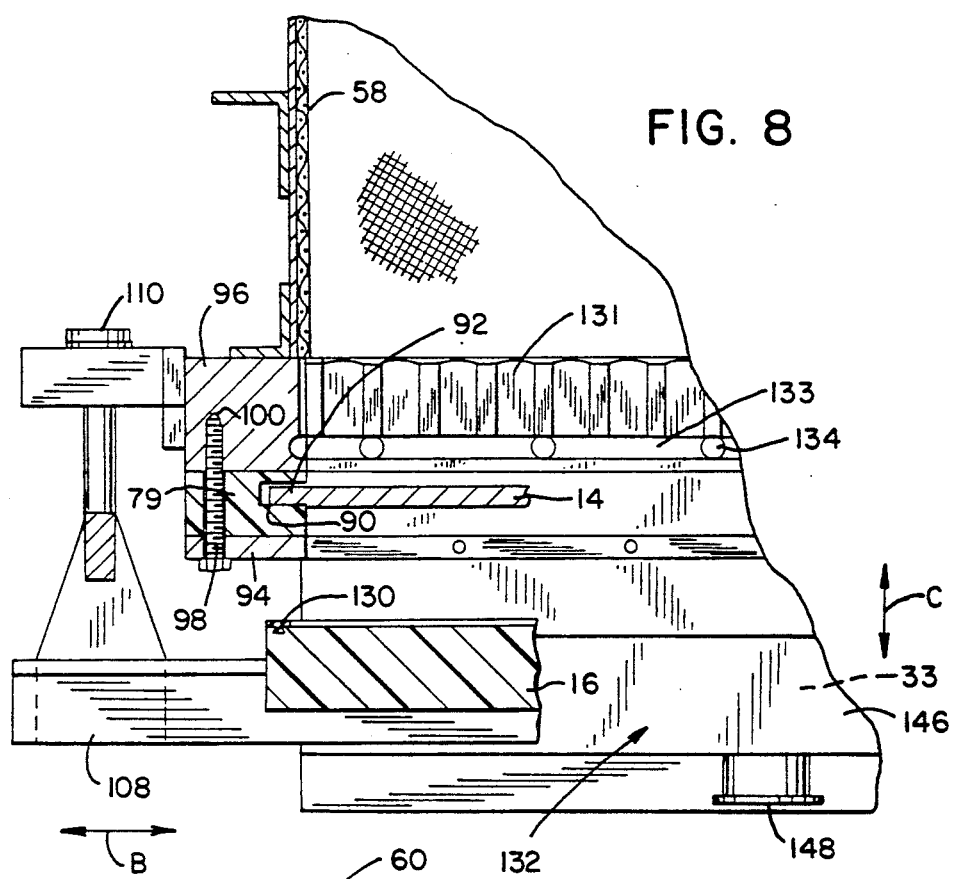
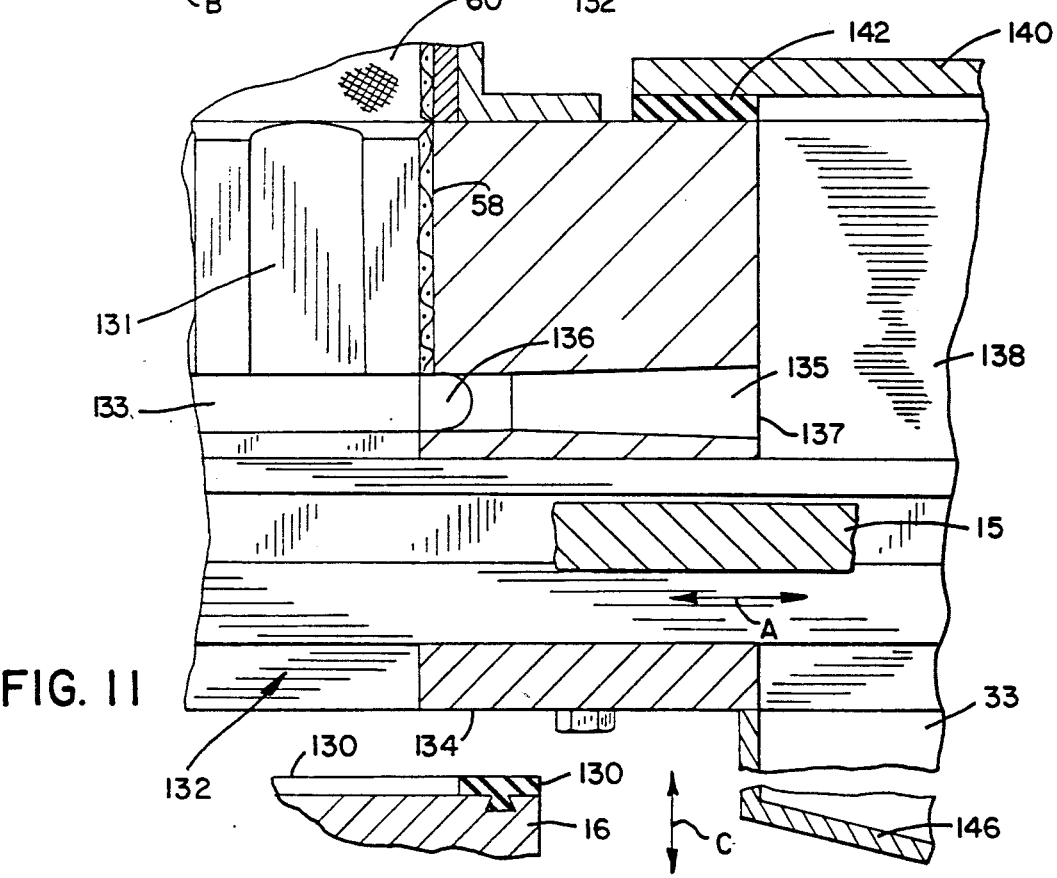

CONTINUOUS CHEESE FORMER FOR BULK CHEESE

BACKGROUND OF THE INVENTION

1. Field of the Invention

The subject invention is directed to a means for processing bulk cheese and is particularly directed to a continuous apparatus for making large blocks of bulk cheese.

2. Cross-Reference To Related Application

This application is related to the co-pending application entitled: "PROCESS FOR MAKING BULK CHEESE", by Alan J. Pittleko, filed on even date herewith, Ser. No. 07/741,320.

3. Description of the Prior Art

Bulk cheese has typically been made in 600-650 pound blocks, or 500 pound barrels. In the prior art, the bulk cheese blocks and barrels were made by feeding a curd mixture into a suitably sized container such as a large barrel or drum, drawing whey from the mixture, in the container, probing the container with a vacuum tube compressing the cheese to squeeze out moisture, and drawing a vacuum on the perimeter of the cheese to draw out the moisture, whey and air to establish the right consistency. Basically, the entire process was performed in the container in which the cheese was both stored and shipped.

Over the years, cheese manufacturing equipment and processes have developed to the point where smaller quantities of cheese such as, by way of example, 40 pound blocks and the like can be made in a continuous process. In this process, the cheese is generally manufactured in a vertical tower wherein the curd is drawn into the tower and the vacuum draw is used to separate the water, air and whey from the curd, with the curd collecting at the bottom of the tower and compressing to form cheese. The bottom of the tower is then opened to release the cheese which is cut into predetermined size blocks. The continuous process for manufacturing the 40 pound cheese blocks has substantial advantages over the cheese making methods wherein each finished unit of cheese is made in the cheese storage and shipping container. Specifically, using the continuous process provides a higher quality cheese with a better controlled consistency, reduces the amount of space required to make the cheese, reduces the labor involved in the various steps and facilities clean up while enhancing sanitation of the operation. A specific advantage of the continuous process is that the cheese is ready for cooling and shipment once it is removed from the tower. An example of a cheese block former for continuously making 40 pound blocks of cheese is the CBF Cheese Block Former manufactured by Damrow Company, Fond du Lac, Wis. The CBF cheese block former is adapted to process 1500 pounds per hour for producing the 40 pound blocks. When functioning at full capacity, the CBF former can produce approximately 40 pound blocks per hour.

In the batch to make bulk cheese in barrel or 640 pound blocks, as taught in the prior art, the cheese has to be processed in the containers, requiring a substantial amount of floor space for the process and requiring a greater number of containers for the same amount of cheese since the cheese is in the containers throughout the entire cheese making process, including storage and shipping.

While the continuous process for making 40 pound blocks has greatly enhanced the cheese making methods of the prior art, it has been heretofore impossible to make large bathes of cheese such as the 600-650 pound blocks and 500 pound barrels without making single batch units of cheese in the containers in which the cheese is both stored and shipped. Typically, a 40 pound block of cheese is rectangular in shape and is 7 inches high by 14 inches deep by 11 inches wide. In contrast, a 640 block of cheese is 28 inches high by 28 inches deep by 22 inches wide. A 500 pound barrel is approximately 34 inches high with a diameter of 22 inches.

A major problem in making large batch cheese in a continuous process is the proper removal of moisture, air and whey from the center of the cheese. In the prior art, this has been overcome by pressing the cheese into the container, forcing the whey, air and moisture out of the curds after the cheese in the container. With 40 pound blocks, a typical vacuum such as, by way of example, 28 inches of mercury, is sufficient to draw the moisture, air and whey from the center of the smaller block.

SUMMARY OF THE INVENTION

The subject invention is directed to an apparatus for making large batches of cheese in a continuous process, such as, by way of example, 600-650 pound blocks of cheese or 500 pound barrels of cheese. The invention comprises a tower system, wherein a center perforated screen or tube is inserted down the center of the tower and is placed under a vacuum to draw whey, moisture and air from the curd mixture into the center of the screen as it is introduced into the tower. A peripheral screen around the inside wall of the tower is also used to draw whey, moisture and air from the cheese mixture as it is introduced into the tower. The whey is then gravity fed to the bottom of the tower where it is collected and removed from the system.

In the preferred embodiment of the invention, the tower is hollow and substantially cylindrical with a diameter of approximately 19-21 inches. By using the center tubular screen in combination with the perimeter screen, the maximum distance between either screen and the midpoint of the cheese mixture is not more than 8 inches. This permits a large quantity of cheese to be introduced into the tower, while permitting ready vacuum withdrawal of the air, moisture and whey mixed with the curd mixture as it is introduced.

In its preferred form, the tower includes a pair of cyclonic intake chambers at its top, wherein the curd mixture is introduced and spun to produce a peripheral spinning, filling action as the curd moves down into the tower. A vacuum is drawn on the tower through the center tubular screen and the outer peripheral screen and top of the cyclones to continuously withdraw whey, moisture and air from the mixture as it collects at the bottom of the tower. The whey and moisture is removed from the tower by gravity feed and is collected at the base of the tower in whey collecting chambers, from which it is gravity drained into a whey storage tank.

In the preferred embodiment of the invention, the bottom of the tower is open to a discharge port which is in communication with a cheese receiving station. A pair of bilateral guillotine knife blades are disposed in communication with the discharge chamber at the base of the tower and form the support for the tower of cheese as the tower is filled. A discharge closure door is disposed beneath the guillotine blades and is adapted to move between extended and retracted positions and into sealing engagement with the tower, permitting the tower to be placed under a vacuum draw during the filling process. When the door is retracted, the blades can be opened by laterally sliding them away from the discharge opening, permitting the tower of cheese to fall through the discharge opening and onto the cheese receiving station. After a predetermined amount of cheese has passed through the opening, the blades are activated to close and cut the cheese into predetermined sized blocks, and to stop the flow of cheese from the tower. The discharge door is then extended and moved into sealing engagement with the tower discharge port, to again seal the tower so that the process may be repeated.

In the preferred embodiment of the invention, the tower from the top of the cyclone intake units to the bottom of the cheese receiving station is approximately 26 feet. The main section of the tower is hollow and substantially cylindrical, having a diameter of approximately 19-21 inches. When the tower is full, the guillotine blades must support a weight of 2200 pounds. The tower manufacturing system of the preferred embodiment is capable of processing 3000 pounds per hour for producing 640 pound blocks and/or 500 pound barrels. That is, the system of the present invention is capable of producing five 640 pound blocks or 500 pound barrels of cheese per hour.

In the preferred embodiment of the invention, the tower is slightly tapered with the bottom being of large diameter than the top. The preferred taper angle is approximately 5°. This facilitates removal of the cheese when the discharge door is opened.

By utilizing the peripheral screen in combination with the tubular center screen, the whey, moisture and air is consistently removed from the mixture. This produces a finished 640 pound block or 500 pound barrel of cheese which is comparable to the quality of cheese produced by the continuous 40 pound block cheese manufacturing systems of the prior art.

A clean-in-place system may be used with the tower, whereby the tower may be cleaned between shifts by injecting rinse water and cleaning solution directly into the tower and through the same lines used for moving the curd, whey and air through the system.

It is, therefore, an object and feature of the subject invention to provide for a continuous method and apparatus for manufacturing large blocks and barrels of cheese using a continuous cheese processing method.

It is a further object and feature of the subject invention to provide for a continuous method and apparatus for manufacturing 600-650 pound blocks of cheese and/or 500 pound barrels of cheese.

It is yet another object and feature of the subject invention to provide for a tower cheese manufacturing system for manufacturing large blocks and barrels of cheese in a continuous processing system, wherein the system may be cleaned in place between shifts.

It is an additional object and feature of the subject invention to provide for a continuous cheese making system for making large blocks and/or barrels of cheese in a consistent and reliable manner.

It is also an object and feature of the subject invention to provide for a tower closure means capable of supporting up to 2200 pounds of cheese while sealing the tower to permit a vacuum draw for removal of whey, air and moisture from the curd mixture as it is introduced into the tower.

Other objects and features of the invention will be readily apparent from the drawings and detailed description which follow.

BRIEF DESCRIPTION OF THE DRAWINGS

FIG. 2 is a plan view of a cheese tower in accordance with the teachings of the subject invention.

FIG. 3 is a view similar to FIG. 2, showing the interior of the tower.

FIG. 5 is an enlarged partial section view taken generally along line 5—5 of FIG. 4.

FIG. 8 is an enlarged partial section view taken generally along line 8—8 of FIG. 4.

FIG. 9 is an enlarged partial view taken generally along line 9—9 of FIG. 5.

FIG. 10 is a partial section view taken generally along line 10—10 of FIG. 5.

FIG. 11 is a partial section view taken generally along the line 11—11 of FIG. 4.

DETAILED DESCRIPTION OF THE PREFERRED EMBODIMENT

Figure 1:
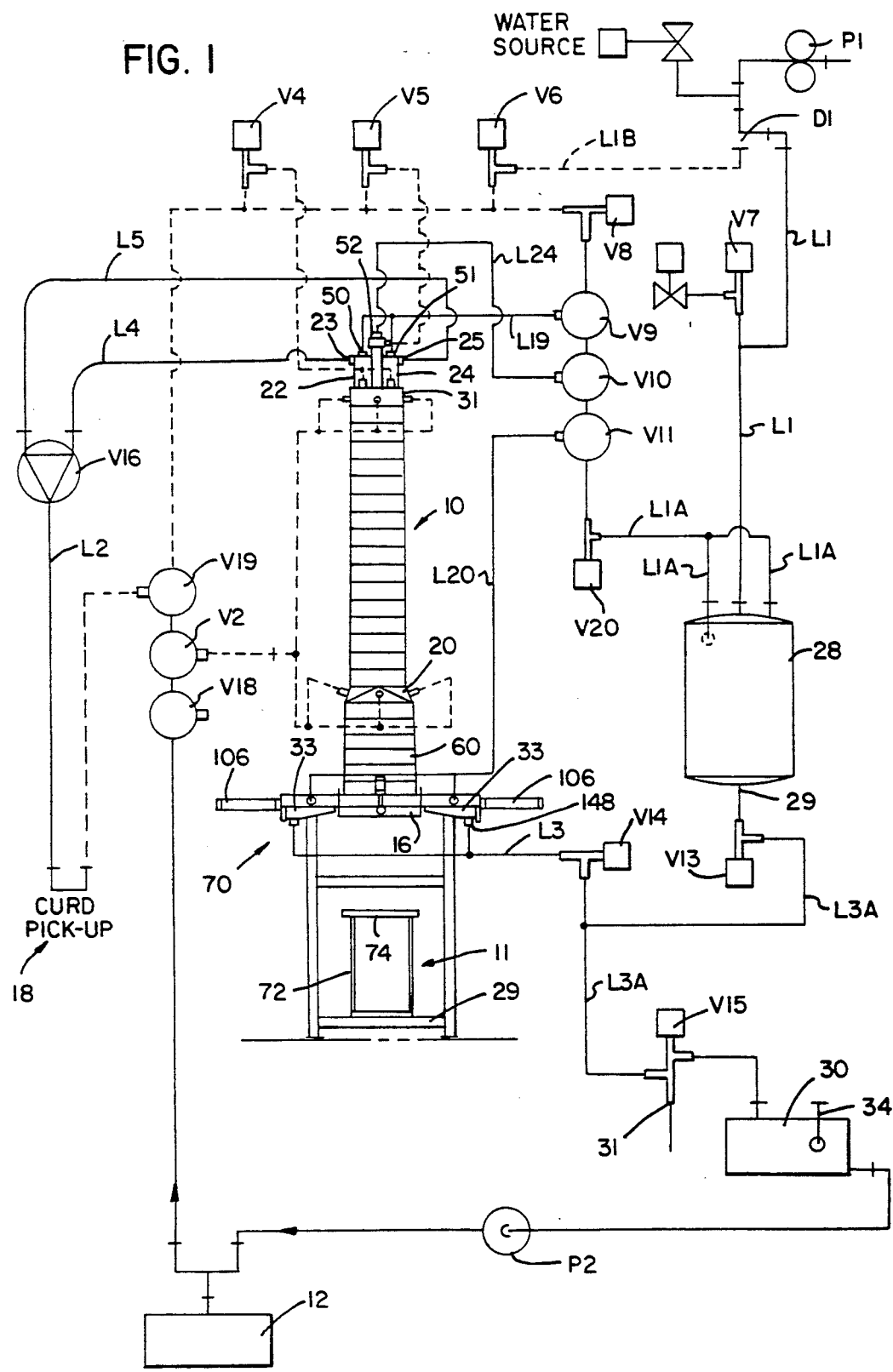
FIG. 1 is a diagrammatic illustration of a vacuum draw and control circuit for making bulk cheese in accordance with the subject invention.

As shown in FIG. 1, the cheese forming machine generally comprises a tower 10 mounted above a cheese receiving platform or station 11 and including a pair of cyclonic input chambers 22 and 24 mounted at the top 31 thereof. The cyclonic input chambers or cyclones are of standard design and are used for generating a circumferential cyclonic action for materials such as cheese curds which are introduced into the cyclones 22 and 24 via the inlet ports 23 and 25, respectively. The ports at 50 and 51 of the cyclone 22, 24, respectively, are attached to a vacuum source and a clean-in-place system, as will be described herein.

As best shown in FIG. 3, a central tube 52 is also mounted at the top 31 of the tower 10 and extends downwardly into the center of the tower. As best seen in FIGS. 2 and 3, the central tube 52 is disposed in the center hollow core of a cylindrical mesh screen 54 which extends into the main section of the tower. In the preferred embodiment, the screen 54 has a closed bottom 57. The tube 52 extends the length of the screen 54 and has an open end 53 just above the closed bottom 57 of the screen 54. The tube 52 is connected to a standard vacuum source such as pump P1 shown in FIG. 1 via line L24 to draw a vacuum on the tower through the screen 54.

A peripheral mesh screen 56 extends around the entire cylindrical inner wall of the tower 10. This screen extends from the top 31 to the transition section 20 of the tower. A second peripheral screen section 58 extends around the peripheral inner side wall of the lower section 60 of the tower and is used to shape the final configuration of the cheese. For example, the screen 58 would be of circular cross-section if the cheese blocks were to be in the shape of cylinders such as barrel cheese. When the cheese blocks are in the 640 pound block form, which is a substantially rectangular solid block, the screen 58 is of rectangular cross-section. In the preferred embodiment, the peripheral screen 58 is always in place and is of a rectangular cross-section for forming 640 pound blocks. A removable insert of circular cross-section may be placed inside the screen 58 to define the perimeter of a barrel for forming 500 pound barrels.

The vacuum line L20 from pump P1 (FIG. 1) is connected to the interior of the tower via the vacuum ports 59 (FIG. 2) of the whey discharge trays 33, as will be further described. The ports 62, 63 and 64 and a fourth port (not shown) diametrically opposite port 64 at the top of the tower and the ports 65, 66 and 67 and a fourth port (not shown) diametrically opposite port 66 at the transition point of the tower are used during the clean-in-place cycle, as will be described. The ports 50, 51 in the cyclones 22, 24, respectively, and the port 68, which is the end of a tube in communication with the central screen 54, are also used during the clean-in-place cycle.

Figure 4:
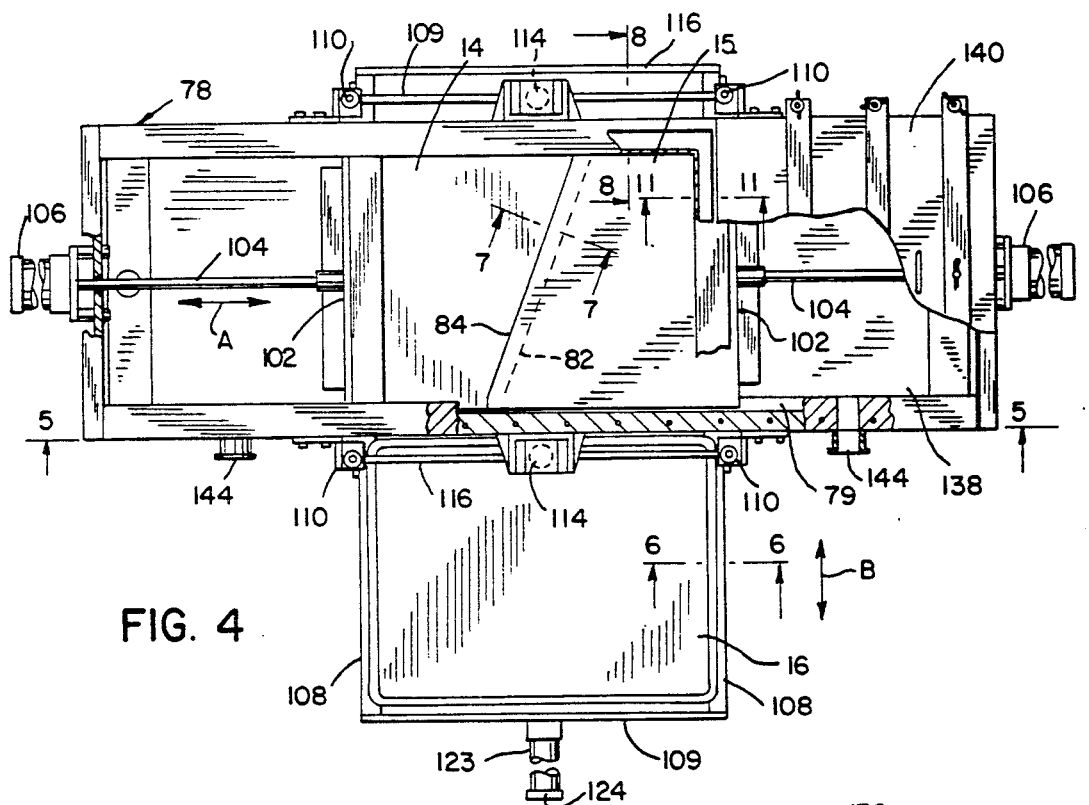
FIG. 4 is an enlarged partial section view taken generally along line 4—4 of FIG. 2.

The lower open end of the tower assembly, including tower 10, transition 20 and lower unit 60, is in communication with the closure and cut-off assembly generally indicated by the numeral 70 which includes guillotine cutters 14 and 15 (see FIG. 4) and the closure discharge door 16 (also FIG. 4). During the cheese forming operation, the guillotine blades 14 and 15 are in the closed position as shown in FIG. 4 and the door is in the closed and in sealing position (not shown).

As shown in FIG. 1, ports 23 and 25 of the cyclones 22 and 24, respectively, are in communication with a curd pick-up point 18 via the diverter valve V16. As the diverter valve V16 directs the curd mixture intermittently between lines L4 and L5 and into cyclones 22 and 24, respectively, the cyclonic action created by the cyclones causes the curd mixture to swirl downwardly into the tower 10, causing it to fill in a circular motion from the bottom up. That is, the tower is gravity fed, the weight of the curds causing the curds to drop to the bottom of the tower as the vacuum lines L24, L19 and L20 create a draw in the tower through the screens 54, 56 and 58. The lighter, smaller whey particles and moisture are drawn through the screen mesh and into the area between the screen 56 and 58 and the tower perimeter, where gravity causes the whey to drop down along the outer walls of the tower. The whey is also drawn through center screen 54 and drops to the closed bottom of the screen where it is drawn into tube 52 and removed from the tower. The whey collected at the bottom perimeter of the tower is drawn into the whey collection trays 33, as will be described. From there, the whey is drawn from the tower assembly via line L3 (FIG. 1) and into the whey balance tank 30 for discharge into whey storage 12.

The curds continue to form and compress in the tower 10 as it is loaded from the top via cyclones 22 and 24. As the tower loads, the weight of the curds causes natural compression of the mixture at the bottom of the tower and the constant vacuum draw through the screens continues to remove moisture, air, and whey compressing the curds into a solid cheese block.

After the cheese has reached the proper consistency, the vacuum is removed and the discharge door 16 is lowered to break the seal and is retracted to the open position shown in FIG. 4. At this time, the guillotine blades 14 and 15 are opened, as shown in FIG. 5 and the cheese in the tower drops through the open bottom end of the tower lower unit 60.

In the preferred embodiment of the invention, and as shown in FIG. 2, the cheese receiving station 11 includes a portable, collapsible platform 72 which has a stage 74 for receiving the cheese C (as shown in phantom in FIG. 2). After a predetermined volume of cheese has dropped through the tower, guillotine blades 14 and 15 are closed and cut through the cheese to slice it at the appropriate point. The predetermined block of cheese C then rests on the stage 74, after which it may be removed from the assembly. In the preferred embodiment, the platform 72 is an elevator platform, whereby the cheese may then be lowered away from the tower to facilitate its removal from the platform and tower assembly. After the guillotines close to the position of FIG. 4, the remaining cheese is contained in the tower 10 and refilling at the top via cyclones 22 and 24 may occur.

During the cheese unloading and cutting operation, the vacuum draw on the tower is ceased. In order to refill the tower after the guillotine doors 14 and 15 have been reclosed, the discharge closure door 16 is moved back into alignment with the closed blades 14 and 15 and is raised to effect a seal at the bottom of the tower, permitting the vacuum to again be drawn on the tower. At this point, the cheese curd mixture is again introduced via ports 23 and 25 in cyclones 22 and 24, respectively, for refilling the tower, and the process is repeated.

In the preferred embodiment of the invention, the cheese tower stands approximately 26 feet high from the floor of the receiving station to the top of cyclones 22 and 24. The cross-section of the circular upper tower 10 is approximately 19–21 inches in diameter. The lower tower section 60 is 21 by 27 inches. When the tower is filled with curds, the weight of the tower of cheese is approximately 2200 pounds. Therefore, the cutting and discharge assembly 70 must be able to accommodate substantial weight and force as it both holds the weight of the cheese and cuts through the 27 inch cross-section of the rectangular block of cheese or the 21 inch diameter of the barrel of cheese as the cheese moves through the discharge opening.

Figure 6:
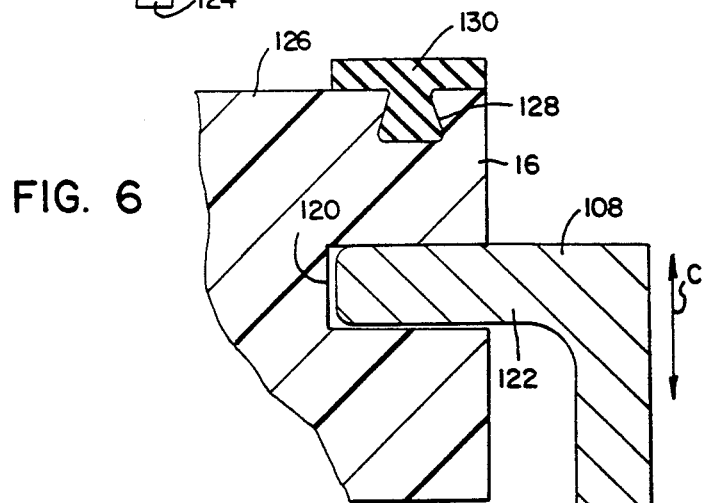
FIG. 6 is an enlarged partial section view taken generally along the line 6—6 of FIG. 4.
Figure 7:
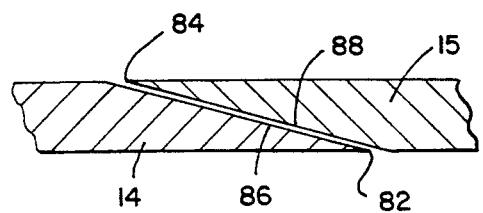
FIG. 7 is an enlarged partial section view taken generally along the line 7—7 of FIG. 4.

The preferred embodiment of the guillotine and discharge door assembly is shown in FIGS. 4, 5, 6, 7 and 8. With particular reference to FIG. 4, it will be noted that a stainless steel frame 78 is disposed beneath the open lower end of the lower tower unit 60. The frame includes guide rails 79 which provide ways for the guillotine blades 14 and 15. As is best shown in FIGS. 4 and 7, the guillotines have angled blades 82 and 84 with complementary beveled edges 66 and 88. Using this configuration permits the guillotine blades to cut point-to-point across the cheese as the blades slide along the ways 79, greatly reducing the amount of force required to move the guillotine through the solid block of cheese. The complementary bevel tapers 86 and 88 provide for a smooth slicing action as the guillotine is moved through the block of cheese and the guillotines blades 14 and 15 slide into mated relationship with one another, as particularly shown in FIG. 7.

As is best shown in FIG. 8, the rails 79 are of a U-shaped cross section having a slot 90 for receiving the reduced outer peripheral edge 92 of the respective guillotine blade. In the preferred embodiment, a spacer 94, which defines a portion of the whey drainage system as will be explained, is disposed beneath the rail 79 and the rail 79 is abutted against the lower steel framework 96 of the tower. As shown, the spacer 94 and rail 79 are secured onto the framework section 96 via the threaded bolt 98 which is received by the tapped hole 100 in the frame 96. Of course, it will be readily understood that other suitable means for attaching the rails 79 to the frame could be readily substituted for the assembly shown. In the preferred embodiment the rails 79 are made of nylon with each slot 90 adapted for receiving the edges 92 of the blades 14 and 15. The nylon structure aids in reducing the friction of the blades as the blades slide along the guide ways.

As is specifically shown in FIG. 4, the outer end 102 of each guillotine blade 14 and 15 is attached to a ram rod 104. Each ram rod 104 is carried in a solenoid actuated cylinder 106 for sliding movement along the direction of arrow A for movement between extended and retracted positions for closing the guillotines 14 and 15 to the position of FIGS. 4 and 7 and for opening the guillotines blades 14 and 15 to the position of FIG. 5. In the preferred embodiment, the cylinders 106 are air or pneumatic operated by solenoid control valves. However, other mechanisms for opening and closing the guillotine blades 14 and 15 could be substituted, as will be readily understood by those skilled in the art.

The discharge closure door 16 is best shown in FIGS. 4, 5, 6, 8 and 11. As thereshown, a pair of elongate L-shaped parallel guide rails 108 form the side members of a door carrier. Cross braces 109 are secured to each rail and form the end pieces of the carrier. The door is mounted on the rails 108 for sliding motion in a direction generally orthogonal to the direction of travel of the guillotine blades 14 and 15, as indicated by the arrow B. Door 16 is slidably movable on the rails 108 for movement into an extended closed position directly beneath the closed guillotine blades 14 and 15 and the retracted, open position shown in FIG. 4.

In the preferred embodiment, the guide rails 108 are each mounted on lift assemblies 110 (see FIG. 4). The push rod 115 (FIG. 5) of a cylinder 114 is in communication with each lift mechanism 110 via the support braces 116 (FIGS. 4 and 5). The cylinders 114 are operable to move push rods 115 up and down (as drawn) and move the rails 108 between upper closed position (FIG. 5) and a downward open position (FIGS. 8 and 11), as depicted by the arrow C. This lifts the door 16 up into an abutting and sealing relationship with the framework for the guillotine for closing and sealing the entire tower assembly, permitting a vacuum to be drawn on the tower when the door is in the closed position.

As best shown in FIG. 6, the door 16 includes a U-shaped slot 120 adjacent its opposite outer edges for receiving the runner edge 122 of the rail 108. The door is connected directly to the drive rod 123 of the cylinder 124 (FIG. 4), which in the preferred embodiment is a pneumatic cylinder for moving the door between extended and closed position and the retracted, open position along the direction of the arrow B. The door is shown in the open position in FIG. 4. It will be readily understood by those skilled in the art that other mechanisms for opening and closing the door 16 could be utilized.

As best seen in FIGS. 5, 6 and 11, the upper surface 126 of the door 16 includes a peripheral dovetailed groove 128 extending about the entire perimeter thereof for receiving a resilient snap-in, circumferential raised seal 130. The seal 130 is disposed outwardly of the open discharge port 132 of the tower assembly (see FIGS. 8 and 11) and is adapted to abut against and form a sealing with the lower edge 134 of the assembly frame when the door is raised to its uppermost position. This seals the entire discharge opening of the tower assembly, permitting the entire tower assembly to be placed under a vacuum draw for creating a negative pressure to draw cheese curds in through the cyclones 22 and 24.

During the cheese forming phase of the operation, the guillotines 14 and 15 are normally closed to the position of FIG. 4. Then, the door 16 is moved from the retracted position of FIG. 4 to a position directly beneath the closed guillotine blades 14 and 15 and in communication with the discharge opening 132, as shown in FIG. 11. Cylinders 114 are then activated to lift up the entire door assembly, including the rails 108, to bring the circumferential seal 130 into sealing contact with the lower surface 134 of the assembly frame to seal the lower discharge opening 132. The guillotine blades and door stay in this position during the entire filling process.

Once the cheese tower is properly filled with curds and the cheese is properly compressed through the natural filling action and in response to the vacuum draw through the screens 54, 56 and 58, the vacuum is removed. Cylinders 114 are then actuated to lower the door to the position of FIGS. 8 and 11, breaking the seal between the resilient seal 130 and the lower abutment surface 134 of the frame. Once the door is fully lowered, as shown in FIG. 11, the cylinder 124 is actuated to withdraw the door to the retracted position shown in FIG. 4. At this point, the cylinders 106 are actuated to retract the guillotine blades 14 and 15 from the closed position of FIGS. 4 and 7 to the open position of FIGS. 5 and 11, opening the lower discharge end of the tower 10. The cheese then falls, by gravity, through the discharge opening 132 until a predetermined amount of cheese has passed through. At this point, the guillotine cylinders 106 are actuated to drive the blades 14 and 15 through the cheese, stopping its downward progress and slicing the cheese into predefined lengths. Once the guillotines are fully closed to the position of FIG. 4, the door cylinders 114 and 124 may again be sequentially actuated to bring the door back into sealing relationship with the lower abutment surface 134 of the tower assembly and close the discharge opening 132, after which the cheese forming process may be repeated.

As best shown in FIGS. 4, 5, 8, 9, 10 and 11, the whey is separated from the curd in the tower using the vacuum draw in combination with a natural gravity feed. With specific reference to FIGS. 8, 9 and 10, it will be noted that the screen 58 extends downwardly beyond the inner wall 21 of the lower unit 50 of the tower and through the upper portion 96 of the framework to just above the plane of travel of the guillotine blades 14 and 15. As is best seen in FIGS. 8 and 11, the upper portion 96 of the tower base framework includes a plurality of open channels 131 which are in communication with the space between the screen 58 and the tower wall 21, and a plurality of horizontal channels 133 and 134 in communication with the vertical open channels 131. As is best shown in FIG. 10, the channels 131, 133 and 134 are in open communication with a channel 135 which is an integral portion of the lower framework 96. The channel 135 has an open end port 137 which is in communication with an upper portion 138 of the whey collection chamber 33. In the preferred embodiment, a cover 140 (FIG. 5) is suitably releasably secured over the top of the whey chamber portions 33 and 138 and a peripheral resilient seal 142 (FIGS. 5 and 11) is disposed about the perimeter thereof between the frame 96 and the cover 140 for sealing the chamber to permit a vacuum draw to be placed thereon. A seal 143 is provided between guillotine drive rods 10 and the wall of chamber 138.

The vacuum line L20 is in communication with the whey collection chambers 33 and 138 via port 144, as shown in FIGS. 1, 4 and 5. As is best shown in FIG. 5, when the cover 140 is in place, the chamber 138 and 133 define a closed whey collection chamber. The lower surface 146 of the whey collection chamber 33 is tapered downwardly toward a drain 148 which is in communication with the whey balance tank 30 and whey storage tank 12 via drain line L3 (see FIG. 1). The whey which is drawn through the screens 56 and 58 to the perimeter of the tower 10 and lower tower section 60 drains down the inner side wall 21 of the tower, by gravity, and collects in the various channels 131, 133 and 134, where it is drawn through channels 135 and port 137 by the vacuum draw at port 144 and into the whey collection chambers 33 and 138. The downward slope 146 of the lower surface of the whey collection chamber 33 directs the collected whey into the drain 148, from which it is removed from the tower system.

The whey collected in the center hollow core of the tower inside screen 54, as drawn by the vacuum on tube 52, collects at the bottom 57 of the screen 54 and is drawn through tube 52, by which the whey is removed from the tower assembly. As shown in FIG. 1, the whey in tube 52 is removed via line L24 and is removed from the vacuum system at the interceptor 28. The interceptor 28 has a bottom drain at 29 which allows the collected whey to gravity feed and drain via line L3A into the whey balance tank 30 and ultimately into the whey storage tank 12. As best seen in FIG. 11, the whey collected at the bottom of the tower is vacuum drawn into channels 132 and through channels 136 and 135, then discharged through port 137 into chamber 138 and pan 33, from which it is gravity discharged.

FIG. 1 is a diagrammatic illustration of a negative pressure control circuit used for operating the cheese making process utilizing the tower system of the subject invention. The various pumps, valves and actuators thereshown may be manually operated or may be electromechanically controlled in the proper time sequence, as will be readily understood by those who are skilled in the art. A vacuum pump P1 supplies a draw on the main line L1 of the circuit for operating the system. In the preferred embodiment, a 28 inch maximum draw is used. A plurality of valves V1 through V20 are operable to open and close the various lines in the system for filling the tower with curd, separating the curds from the whey in the tower 10, draining the whey from the system and into a whey storage tank 12 and forming cheese in the tower for discharge through door 16. In the preferred embodiment, the cylinders associated with the guillotines 14, 15 and the discharge door 16 and operable for removing finished blocks of cheese from the system are solenoid or computer controlled. However, as will be readily understood by those skilled in the art, other actuator systems could be substituted.

In the preferred embodiment of the invention, a curd pick up line L2 is in communication with a supply of curd, as indicated at 18. The tower 10 is mounted over the guillotine cutter 14, 15 and is generally cylindrical in configuration. In the preferred embodiment, the tower 10 is slightly tapered at a 5° angle with the lower diameter larger than the top, to facilitate downward movement of cheese when the door 16 is opened. Inside the cylindrical perimeter of the tower is the round perforated screen 56 for separating the whey from the curd introduced into the top of the tower from which it is drained via line L3 ultimately into the whey storage tank 12. A central tube 52 (FIG. 2) also draws the whey through screen 54 and ultimately deposits the collected whey in the whey storage tank 12.

A transition point 20 is provided in the tower, approximately ¾ of the way down from the top of the tower, transcending the cylindrical tower into a lower section 60 of substantially rectangular shape for making 640 pound blocks of cheese. The lower section may be altered, as desired, for making barrel cheese. Specifically in the preferred embodiment, the lower section 60 and internal peripheral screen 58 are of rectangular cross-section for forming rectangular blocks of cheese. A cylinder insert may be selectively placed within screen 58 for forming cylindrical barrels of cheese.

The guillotines 14, 15 are mounted on two solenoid operated cylinders 106 at the bottom of the tower. A closure door 16 is disposed directly beneath the guillotine cutters 14, 15. With the tower empty, the guillotine closed and the door closed and in sealing relationship with the tower, the fill process is ready to begin.

Line L2 is in communication with the curd supply 18. The vacuum pump P1 is initiated to draw a 28 inch vacuum on the system and on the tower. Line L1 is placed under vacuum draw. This places the interceptor tank 28 under negative pressure. Lines L1A, attached to tank 28, are also under negative pressure and are in communication with valves V9, V10 and V11. Valve V10 is opened to place a draw on line L24 and tube 52. Valve V9 is opened to place a draw on L19 and on the cyclones 22 and 24. Valve V11 is opened to place a draw on line L20 and on the whey collection chambers 33 and 138. This places the entire tower system under a negative pressure.

The curd feed valve V16 is opened and is operable to alternate between the two cyclones 22, 24 at the top of the tower. Curd is drawn in line L2 by the vacuum introduced via lines L4 or L5 into cyclones 22 or 24, respectively, to fill the tower. The perforated screen 54 down the center of the tower allows whey drainage from the center area of the cheese to flow into the hollow core where it is removed by tube 52 and from the tower 10 via line L24. Whey is also drawn to the perimeter through screens 56, 58 and into the collecting chambers 33, 138 by the draw on line L20, and is removed from the tower through drain line L3. When the tower is full, the vacuum draw is removed by closing valves V9, V10 and V11. The guillotine cutter is then opened as described, allowing the cheese to drop to and settle on the cheese receptacle platform 74. The guillotine closes and the closure door is closed to seal the tower and the cycle is repeated.

In the preferred embodiment, the tower is capable of handling a 28 inch vacuum. The interceptor/vacuum reservoir 28 serves to collect whey and fines to keep them from being drawn into the vacuum pump P1. The collected whey and fines gravity drawn from tank 20 through port 29 and line L3A into whey balance tank 30. The valve V13 is used to control flow of whey from the interceptor/vacuum reservoir 28 into the whey balance tank 30 at the end of each cycle. During the fill sequence, valves V13 and V14 are closed.

It has been found that the tower of the preferred embodiment may be filled from a typical curd supply as indicated at 18 in approximately 300 seconds. The interval used for filling each of the cyclones is approximately 30 seconds per cycle. Once the tower 10 is filled, the curd feed diverter valve V16 is closed. Valves V9, V10 and V11 are also closed at this point. The intercepter drain valve V13 is now opened and the lower tower whey drain valve V14 now opens. These valves remain open for 120 seconds. While these valves are open, the process control valves V9, V10 and V11 are closed to end the vacuum sequence. These valves are closed for approximately 120 seconds. This process is repeated until the tower is full as indicated by a sensor, not shown, provided near the top 31 of the tower 10.

Once the tower is full, the process control valves V9, V10 and V11 are again closed to end the vacuum draw sequence on the tower. The intercepter drain valve V13 and lower tower whey drain valve V14 is opened. At this point, the discharge door frame is lowered, breaking the seal at the bottom of the tower. The door is then opened. The guillotines are next opened, allowing the tower of cheese to drop through the opening at the bottom of the tower and onto the cheese receiving platform 26. When a predetermined amount of cheese has dropped through the tower, the guillotines are closed to slice the cheese at a predetermined point for providing, in typical usage, a 640 pound block of finished cheese. Once the guillotines are closed, the door is closed and moved into sealing relationship with the bottom of the tower. The fill steps now may be repeated to refill the tower. The process can be repeated to provide a continuous supply of 640 pound blocks and 500 pound barrels of cheese which are serially removed from the cheese receiving platform 26.

At the end of an operating shift, all of the cheese in the tower 10 may be removed by closing valve V16 and then repeating the door opening and guillotine operating steps until no additional cheese is discharged from the tower. During this phase of the cycle, V16 remains closed and no additional curds are introduced into the tower through the cyclones 22 and 24. When this phase of operation is complete, the tower is now emptied and may be cleaned in place.

The system of FIG. 1 also includes clean-in-place circuitry which incorporates the valves V4, V5 and V6 in combination with valves V18, V19 and V20 and fill valves, previously described, which are also utilized during the fill and processing cycle. The clean-in-place flow paths are indicated by the dotted lines of the circuit diagram. In the preferred embodiment, the clean-in-place cycle begins by manually filling the balance tank 30 with rinse water through a tap supply as indicated at 34. The vacuum pump P1 is disconnected by shifting diverter or gate D1 from the pump P1 to the line L1B, see FIG. 1. Valve V15 is now closed to divert water from the line L3A into the floor drain 31. The supply pump P2 is now started and valve V6 is opened for approximately 30 seconds. In the preferred embodiment, valve V13 pulses during the entire clean-in-place cycle and is opened 95% of the time and closed 5% of the time.

Valves V8 and V9 are next opened, pumping water into the cyclones 22 and 24 for rinsing and cleaning the cyclones. Valves V8 and V10 are opened to pump water into the internal tower vacuum tube for cleaning and rinsing the tube. Valves V8 and V11 are opened to clean the lower tower area. Valve V2 is opened to pump water through the perimeter screen portion for cleaning behind the tower whey draining screens for approximately 30 seconds. Valve V16 is then opened to clean the curd feed lines for approximately 30 seconds. Valve V4 is opened to introduce water into the main tower for cleaning and rinsing the main tower. In a typical operation, this entire sequence will not exceed 30 seconds.

The entire sequence may be repeated until the tower is thoroughly rinsed. At this point, an alkaline solution normally used in cheese processing installations, as well known by those skilled in the art, is introduced into the balance tank 30 and the cycle is repeated. Valve V15 diverts the solution back to tank 30 during this phase. After the wash cycle is completed, the rinse cycle may be repeated. Once this cycle is completed, the water is drained from the system through valve V15 and into the drain 31, draining all water from the system, after which the tower may be returned to operating condition and the sequence, beginning an empty tower start up may be initiated. These cycles may be repeated as necessary.

While certain features and embodiments of the invention are described in detail herein, it will be readily understood that the invention includes all enhancements and modifications within the scope and spirit of the appended claims.

I claim:

1. A cheese forming apparatus for continuously making bulk cheese from a source of a mixture containing curds and whey, comprising:
   a. a tower having a closed top and an open bottom, a substantially cylindrical side wall and a central axis;
   b. discharge means for selectively opening and closing the bottom of the tower;
   c. transfer means for introducing the mixture into the tower at its closed top;
   d. first separator means substantially concentric with and adjacent the inner periphery of the tower side wall and adapted for separating whey from the mixture and collecting the separated whey at the periphery of the tower;
   e. second separator means substantially coaxial with the central axis of the tower and adapted for separating whey from the mixture and collecting the separated whey at the center of the tower; and
   f. means for simultaneously drawing a vacuum on said first separator means and said second separator means when said tower bottom is closed, for placing the tower and transfer means under negative pressure, whereby mixture is drawn into the tower.

2. The cheese forming apparatus of claim 1, further comprising means for withdrawing and removing the collected whey from the periphery and center of the tower.

3. The cheese forming apparatus of claim 1, wherein said discharge means further comprises:
   a. a door movable between an open position whereby formed cheese may be discharged from the bottom of the tower and a closed position for closing and sealing the bottom of the tower; and
   b. a cutter adapted for slicing the discharged cheese at predetermined intervals for producing a selected quantity of cheese.

4. The cheese forming apparatus of claim 3, wherein said cutter is movable between an open position and a closed position and is open when said door is initially opened to discharge formed cheese from the bottom of the tower, and is closed for slicing the cheese after a predetermined quantity of cheese is discharged from the tower, said cutter adapted for supporting the cheese in the tower when in the closed position.

5. The cheese forming apparatus of claim 3, wherein said cutter further comprises:
   a. a substantially flat, planar plate having opposite side and end edges;
   b. means for supporting the plate for lateral sliding movement in a direction generally orthogonal to the tower axis between the open and closed positions; and
   c. a cutting blade along one end edge of the plate and adapted for intersecting the axis of the tower when the plate is moved from the open position to the closed position.

6. The cheese forming apparatus of claim 5, wherein the opposite side edges of said plate are parallel and define the sliding path of the cutter, and wherein the cutting blade further comprises a beveled edge extending along the length of the said end edge of the plate and intersecting the parallel side edges at an acute angle.

7. The cheese forming apparatus of claim 5, wherein the opposite side edges of said plate are parallel and define the sliding path of the cutter, and wherein the cutter further includes a pair of guide rails mounted on the bottom of the tower for supporting and defining ways for receiving and supporting the parallel side edges of the cutter plate along the entire path of travel of the cutter plate between the open position and the closed position.

8. The cheese forming apparatus of claim 4, wherein said cutter plate further comprises:
   a. a pair of co-planar cutting plates each having opposite end edges and parallel opposite side edges and disposed at the bottom of the tower in a plane substantially orthogonal to the axis of the tower;
   b. means for supporting said pair of plates for lateral sliding movement between an open non-abutting position and a closed abutting position; and
   c. a cutting blade along one end edge of each plate and adapted for intersecting the axis of the tower when each plate is moved from the open non-abutting position to the closed abutting position, said cutting blades being disposed in abutting contact with one another when the plates are in the closed position.

9. The cheese forming apparatus of claim 8, wherein each cutting blade further comprises a beveled edge extending along the length of the said end edge of each plate and intersects the parallel side edges at an acute angle, the cutting blades of said plates being parallel with one another, whereby the cutting edges abut each other along their entire length when said plates are in the closed position.

10. The cheese forming apparatus of claim 9, wherein said beveled edge of one plate is complementary with the beveled edge of said other plate, whereby said edges are disposed in overlying contact and intersect the plane of said plates at an acute angle when the plates are in the closed position.

11. The cheese forming apparatus of claim 7, wherein the guide rails are of a nylon construction for receiving and supporting the side edges of said plates.

12. The cheese forming apparatus of claim 3, wherein said door further comprises:
   a. a substantially flat, planar plate having opposite side and end edges;
   b. a frame for supporting the door at its side edges;
   c. means for laterally moving the door along its side edges in said frame in a direction generally orthogonal to the axis of said tower; and
   d. means for moving the frame and door in unison in a direction generally parallel to the axis of said tower.

13. The cheese forming apparatus of claim 12, wherein the door further comprises a resilient seal mounted in the upper surface of the flat planar plate and protruding outwardly therefrom, for abutting against and sealing the bottom of the tower when said door is in the closed position.

14. The cheese forming apparatus of claim 13, wherein the upper surface of said door plate includes a peripheral dovetail groove and wherein said seal is of a T-shaped cross-section, wherein the enlarged portion of the T is adapted to be snap fit into and retained by said dovetail groove.

15. The cheese forming apparatus of claim 12, wherein the opposite side edges of said door plate include an elongate groove and wherein said frame further includes a pair of guide rails adapted to be received in said groove for guiding the door in a path substantially orthogonal to the tower axis as the door is moved between the open position and the closed position.

16. The cheese forming apparatus of claim 1, the tower further comprising:
   a. a generally cylindrical upper tower section having a closed top and an open bottom;
   b. a transition section having an open top in communication with the open bottom of the upper tower section and an open bottom, said transition section adapted for expanding the interior cross-section of the tower;
   c. a lower tower section having an open top in communication with the open bottom of the transition section and an open bottom, the lower tower section adapted for shaping the cheese as it is formed in the tower, the open bottom for selectively discharging the shaped cheese from the tower at selected intervals.

17. The cheese forming apparatus of claim 14, wherein:
   a. the upper section of the tower includes a peripheral screen extending from the closed top of the upper tower section to the open bottom of the upper tower section and disposed adjacent to the inner peripheral side wall of the upper section;
   b. the transition section of the tower includes a peripheral screen adjacent its inner side wall and coextensive therewith for expanding the tower; and
   c. the lower section of the tower includes a removable screen having an upper end in communication with the screen in said transition section and a lower end in communication with the bottom of the tower, the screen having a cross section conforming to a predetermined shape for defining the shape of the discharged cheese.

18. The cheese forming apparatus of claim 17, wherein the cross section of said lower screen is rectangular.

19. The cheese forming apparatus of claim 17, wherein the cross section of said lower screen is circular.

20. The cheese forming apparatus of claim 16, wherein the upper tower section includes:

a. a center cylindrical screen extending its entire length and disposed substantially co-axial with the tower, said center screen including a screened bottom; and b. a tube extending through the closed top of the tower and to the bottom of the center screen, said tube having open opposite ends for communicating the bottom of the center screen with the exterior of the tower.

21. The cheese forming apparatus of claim 20, further including means for drawing a vacuum on the perimeter of the three sections of the tower and on the tube, for drawing whey from both the perimeter and central portions of the tower.

22. The cheese forming apparatus of claim 21, further including a common collector in communication with the vacuum means for collecting the whey drawn from the perimeter of the tower and central portions.

23. The cheese forming apparatus of claim 1, wherein said transfer means further comprises a cyclone input means mounted at the top of the tower and in communication with the mixture of curds and whey, wherein the mixture is introduced at the top of the tower in a cyclical downward spiral as the curds and whey is drawn into the tower.

24. The cheese forming apparatus of claim 23, wherein said cyclone input means comprises a pair of cyclone devices and disposed at the top of the tower diametrically opposite one another, wherein said transfer means is further adapted for alternating delivery of the curds and whey between said cyclone input devices.

25. The cheese forming apparatus of claim 24, the transfer means further including selection means disposed between the cyclone input and the mixture source for selectively directing the mixture to one or the other of said cyclone input devices.

26. The cheese forming apparatus of claim 1, further including means for selectively introducing a cleaning solution into the tower.

27. The cheese forming apparatus of claim 26, further including means for pumping the cleaning solution through the vacuum means.

28. The cheese forming apparatus of claim 1, wherein the diameter of the top of the tower is smaller than the diameter of the bottom of the tower.

29. The cheese forming apparatus of claim 28, wherein the reducing side wall of the tower is tapered approximately 5° relative to the axis of the tower.

30. The cheese forming apparatus of claim 17, wherein the upper section of the tower is tapered such that the diameter of the top of the tower upper section is smaller than the diameter of the bottom of the tower upper section, the reducing side wall of the upper section of the tower intersecting the central axis of the tower at an angle of approximately 5°.

31. A cheese forming apparatus for continuously making bulk cheese from a source of a mixture containing curds and whey, comprising:

a. a tower having a closed top and an open bottom, a substantially cylindrical side wall and a central axis;

b. transfer means for introducing the mixture into the tower at its closed top;

c. first separator means substantially concentric with and adjacent the inner periphery of the tower side wall and adapted for separating whey from the mixture and collecting the separated whey at the periphery of the tower;

d. second separator means substantially coaxial with the central axis of the tower and adapted for separating whey from the mixture and collecting the separated whey at the center of the tower;

e. means for withdrawing and removing the collected whey from the periphery and center of the tower;

f. a door movable between an open position whereby formed cheese may be discharged from the bottom of the tower and a closed position for closing and sealing the bottom of the tower;

g. a pair of co-planar cutting plates each having opposite end edges and parallel opposite side edges and disposed at the bottom of the tower in a plane substantially orthogonal to the axis of the tower;

h. means for supporting said pair of plates for lateral sliding movement between an open non-abutting position and a closed abutting position; and i. a cutting blade along one end edge of each plate and adapted for intersecting the axis of the tower when each plate is moved from the open non-abutting position to the closed abutting position, said cutting blades being disposed in abutting contact with one another when the plates are in the closed position.

32. The cheese forming apparatus of claim 31, wherein the support means for said pair of plates comprises a pair of guide rails mounted on the bottom of the tower for supporting and defining ways for receiving and supporting the parallel side edges of the cutter plates along the entire path of travel of the cutter plates between the open position and the closed position.

33. The cheese forming apparatus of claim 32, wherein said door further comprises:

a. a substantially flat, planar plate having opposite side and end edges;

b. a frame for supporting a door at its side edges;

c. means for laterally moving the door along its side edges in said frame in a direction generally orthogonal to the axis of said tower; and d. means for moving the frame and door in unison in a direction generally parallel to the axis of said tower.

34. The cheese forming apparatus of claim 33, wherein the upper surface of said door plate includes a peripheral dovetailed groove and wherein said door further includes a resilient seal mounted in said dovetailed groove for abutting against and sealing the bottom of the tower when said door is in the closed position.

35. The cheese forming apparatus of claim 34, wherein the opposite side edges of said door plate each include an elongate groove and wherein said frame further includes a pair of guide rails adapted to be received in said groove for guiding the door in a path substantially orthogonal to the tower axis as the door is moved between the open position and the closed position.

36. The cheese forming apparatus of claim 31, the tower further comprising:

a. a generally cylindrical upper tower section having a closed top and an open bottom;

b. a transition section having an open top in communication with the open bottom of the upper tower section and an open bottom, said transition section adapted for expanding the interior cross-section of the tower;

c. a lower tower section having an open top in communication with the open bottom of the transition section and an open bottom, the lower tower section adapted for shaping the cheese as it is formed in the tower, the open bottom for selectively discharging the shaped cheese from the tower at selected intervals;

d. a peripheral screen extending from the closed top of the upper tower section to the open bottom of the upper tower section and disposed adjacent to the inner peripheral side wall thereof;

e. a peripheral screen extending the length of the transition tower section adjacent its inner side wall and co-extensive therewith for expanding the tower; and f. a removable screen in the lower tower section having an upper end in communication with the screen in said transition section and a lower end in communication with the open bottom of the tower, the screen having a cross-section conforming to a predetermined shape for defining the shape of the discharged cheese.

37. The cheese forming apparatus of claim 36, wherein the cross-section of said removable screen is rectangular.

38. The cheese forming apparatus of claim 36, wherein the cross-section of said removable screen is circular.

39. The cheese forming apparatus of claim 36, wherein the upper tower section further includes:

a. a center cylindrical screen extending its entire length and disposed substantially co-axial with the tower, said center screen including a screened bottom; and b. a tube extending through the upper tower section and to the bottom of the center screen, said tube having open opposite ends for communicating the bottom of the center screen with the exterior of the tower.

40. The cheese forming apparatus of claim 39, further including means for drawing a vacuum on the perimeter of the sections of the tower and on the tube for drawing whey from both the perimeter and central portions of the tower.

41. The cheese forming apparatus of claim 31, further including means for selectively introducing a cleaning solution into the tower and means for drawing the cleaning solution through the vacuum means.

42. The cheese forming apparatus of claim 31, wherein the diameter of the top of the tower is smaller than the diameter of the bottom of the tower and wherein the reducing side wall of the tower is tapered approximately 5° relative to the axis of the tower.

43. A cheese forming apparatus of continuously making bulk cheese from a source of a mixture containing curds and whey, comprising:

a. a tower having a closed top and an open bottom, a substantially cylindrical sidewall and a central axis;

b. discharge means for selectively opening and closing the bottom of the tower, the discharge means comprising a door horizontally movable between an open position and a closed position and vertically movable between a sealing position and an unsealed position, whereby formed cheese may be discharged from the bottom of the tower when the door is in the open and unsealed positions and whereby the tower may be closed and sealed when the door is moved to the closed and sealed positions; and c. a cutter adapted for slicing the discharged cheese at predetermined intervals for producing a selected quantity of cheese.

44. The cheese forming apparatus of claim 43, wherein said door further comprises:

a. a substantially flat planar plate having opposite side and end edges;

b. a frame for supporting the door at its side edges;

c. means for laterally moving the door along its side edges in said frame in a direction generally orthogonal to the axis of said tower; and d. means for moving the frame and door in unison in a direction generally parallel to the axis of said tower.

45. A cheese forming apparatus for continuously making bulk cheese from a source of a mixture containing curds and whey, comprising:

a. a tower having a closed top and an open bottom, a substantially cylindrical sidewall and a central axis;

b. discharge means for selectively opening and closing the bottom of the tower, the discharge means comprising a door movable between an open position whereby formed cheese may be discharged from the bottom of the tower and a closed position for closing and sealing the bottom of the tower, the door including a substantially flat planar plate having opposite side and end edges, a frame for supporting a door at its side edges, means for laterally moving the door along its side edges in said frame in a direction generally orthogonal to the axis of said tower, and means for moving the frame and door in unison in a direction generally parallel to the axis of the tower; and c. a cutter adapted for slicing the discharged cheese at predetermined intervals for producing a selected quantity of cheese.

46. The cheese forming apparatus of claim 45, wherein said cutter is movable between an open position and a closed position and is opened when said doors initially open to charge formed cheese from the bottom of the tower, and is closed for slicing the cheese after a predetermined quantity of cheese is discharged from the tower, said cutter adapted adapted for supporting the cheese in the tower when in the closed position.

47. The cheese forming apparatus of claim 45, wherein the door further comprises a resilient seal mounted in the upper surface of the flat planar plate and protruding outwardly therefrom, for abutting against and sealing the bottom of the tower when said door is in the closed position.

48. The cheese forming apparatus of claim 46, wherein said cutter further comprises:

a. a substantially flat planar plate having opposite side and end edges;

b. means for supporting the plate for lateral sliding movement in a direction generally orthogonal to the tower axis between the opened and closed positions; and c. a cutting blade along one end edge of the plate and adapted for intersecting the axis of the tower when the plate is moved from the open position to the closed position.

49. The cheese forming apparatus of claim 48, wherein the opposite side edges of the plate are parallel and define the sliding path of the cutter, and wherein the cutting blade further comprises a beveled edge extending along the length of said end edge of the plate and intersecting the parallel side edges at an acute angle.

* * * * *